(12) United States Patent
Sartain

(10) Patent No.: US 8,010,823 B2
(45) Date of Patent: Aug. 30, 2011

(54) POWER SUPPLY WITH INTEGRATED UNINTERRUPTIBLE POWER CONTROL

(75) Inventor: Daryl G. Sartain, Cedar Park, TX (US)

(73) Assignee: GlobalFoundries Inc., Grand Cayman (KY)

( * ) Notice: Subject to any disclaimer, the term of this patent is extended or adjusted under 35 U.S.C. 154(b) by 857 days.

(21) Appl. No.: 11/962,732

(22) Filed: Dec. 21, 2007

(65) Prior Publication Data

US 2009/0164825 A1    Jun. 25, 2009

(51) Int. Cl.
*G06F 9/00* (2006.01)
*H02J 9/00* (2006.01)
*H02J 7/00* (2006.01)
*H02J 1/00* (2006.01)
*H02J 3/00* (2006.01)
*H01H 3/26* (2006.01)
*G05F 5/00* (2006.01)
*G01R 15/00* (2006.01)
*G01R 19/00* (2006.01)

(52) U.S. Cl. .......... 713/340; 713/300; 307/64; 307/125; 307/140; 323/299; 363/15; 363/34; 702/57; 702/64; 714/14

(58) Field of Classification Search .................. 713/300, 713/340; 307/64, 125, 140; 323/299; 363/15, 363/34, 24; 702/57, 64; 714/14
See application file for complete search history.

(56) References Cited

U.S. PATENT DOCUMENTS

| | | | |
|---|---|---|---|
| 5,212,616 | A | 5/1993 | Dhong et al. |
| 5,896,282 | A | 4/1999 | Wu |
| 5,909,360 | A * | 6/1999 | Lavin et al. ..................... 307/66 |
| 6,079,026 | A | 6/2000 | Berglund et al. |
| 6,198,176 | B1 | 3/2001 | Gillette |
| 6,225,708 | B1 | 5/2001 | Furukawa et al. |
| 6,285,159 | B1 * | 9/2001 | Ki et al. ........................ 320/112 |
| 6,657,320 | B1 | 12/2003 | Andrews et al. |
| 7,379,296 | B1 * | 5/2008 | Huang .................... 361/679.41 |
| 2008/0093930 | A1 * | 4/2008 | Chen ............................... 307/66 |
| 2009/0044026 | A1 * | 2/2009 | Li et al. ......................... 713/300 |

* cited by examiner

*Primary Examiner* — Stefan Stoynov
(74) *Attorney, Agent, or Firm* — Hamilton & Terrile, LLP; Stephen A. Terrile

(57) ABSTRACT

An architecture for a power supply with an integrated UPS control system to which generic batteries may be connected. Such an architecture greatly reduces the overall cost, complexity, size and inefficiency of providing uninterruptible power to a device such as a computer system.

15 Claims, 3 Drawing Sheets

POWER SUPPLY WITH INTEGRATED UNINTERRUPTIBLE POWER CONTROL

BACKGROUND OF THE INVENTION

1. Field of the Invention

The present invention relates to the field computer systems and more particularly to computer systems having a power supply with integrated uninterruptible power control.

2. Description of the Related Art

Stand alone uninterruptible power supplies (UPSs) have been used on many known computer systems. UPS systems typically provide backup power to computer systems by running an inverter on batteries to generate AC power. These UPS systems are typically connected in series between an AC power source and the AC power input of the computer system.

One issue relating to UPS systems is that the cost of the UPS system can be a relatively large percentage of the cost of the computer system to which the UPS system is connected, sometimes approaching the actual cost of the computer system. This can be an issue with budget conscious customers, especially where the budget is for the combination of the computer system and the UPS system. Often in locations where power is an issue, a customer's budget is the combination of the computer system and the UPS system.

SUMMARY OF THE INVENTION

In accordance with the present invention, an architecture for a power supply with an integrated UPS control system to which generic batteries may be connected is set forth. In this way, the overall cost, complexity, size and inefficiency of providing uninterruptible power to the computer system may be greatly reduced.

In one embodiment, the invention relates to an apparatus for providing uninterruptible power to a device including a power supply that receives an alternating current signal and generates a direct current signal wherein the direct current signal has a voltage for powering the device. The power supply includes an integrated uninterruptible power supply control system. The integrated uninterruptible power supply control system is integrated within the power supply and includes a connector for coupling to a battery and also provides a direct current signal from the battery to the device when the alternating current signal is not present.

In another embodiment, the invention relates to a power supply for providing uninterruptible power to a device which includes an alternating current to direct current converter circuit that receives an alternating current signal and generates a direct current signal which has a voltage for powering the device and, an integrated uninterruptible power supply control system integrated within the power supply that includes a connector for coupling to a battery and provides a direct current signal from the battery to the device when the alternating current signal is not present.

In another embodiment, the invention relates to a computer system that includes a processor, a memory coupled to the processor and a power supply for providing uninterruptible power to the processor and the memory. The power supply includes an alternating current to direct current converter circuit. The alternating current to direct current converter circuit receives an alternating current signal and generates a direct current signal. The direct current signal has a voltage for powering the computer system. The power supply further includes an integrated uninterruptible power supply control system which is integrated within the power supply and includes a connector for coupling to a battery. The integrated uninterruptible power supply control system provides a direct current signal from the battery to the computer system when the alternating current signal is not present.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
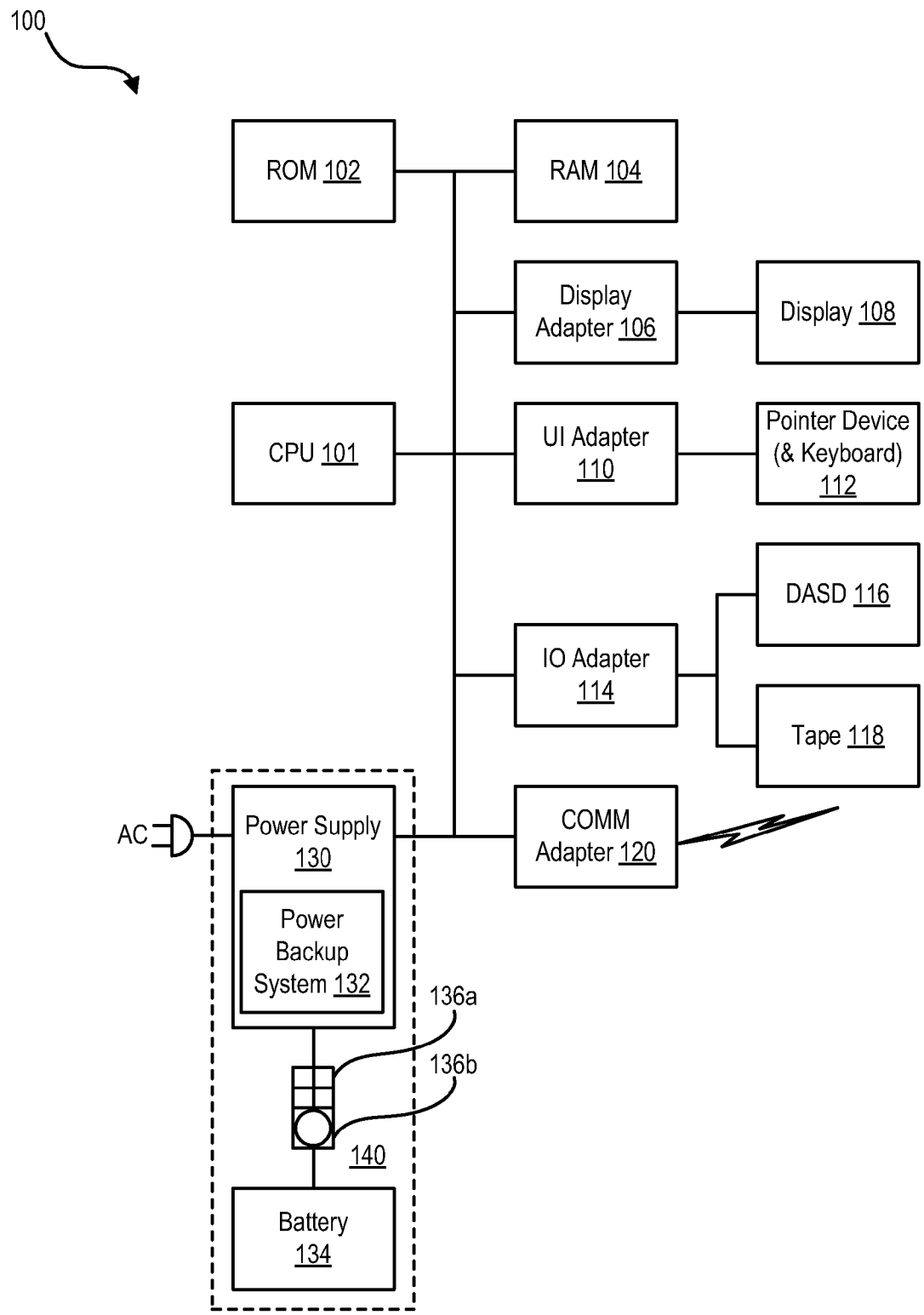
FIG. 1 shows a block diagram representing a computer system having an integrated UPS control system according to the invention.

Referring to FIG. 1, a block diagram of a computer system having an integrated UPS control system is shown. More specifically, the computer system 100 includes a central processor unit (CPU) 101, a read only memory 102, a random access memory or system main store memory 104, a display adapter 106 coupled to a display 108. The CPU 101 is connected to a user interface (UT) adapter 110 which is connected to a pointer device (and keyboard) 112. The CPU 101 is further connected to an input/output (I/O) adapter 114, which is connected to a direct access storage device (DASD) 116 and a tape unit 118. The CPU 101 is also connected to a communications adapter 120 providing a communications function with external devices and/or systems, for example.

The computer system 100 also includes a power supply 130 which in turn include an integrated UPS control system 132. The power supply 132 is coupled to an AC power source and provides power to the computer system 100. A battery (or batteries) 134 may be coupled to the power supply 130 via battery connectors 136a, 136b. The combination of the power supply having a UPS control system 132 and the battery 134 provide a UPS system 140.

During normal operation, an AC input is coupled to an AC input of the system power supply 130. Upon detection of a utility power loss, the integrated UPS control system 132 enables the power supply 130 (in combination with the battery 134) to supply power to the computer system 100.

Figure 2:
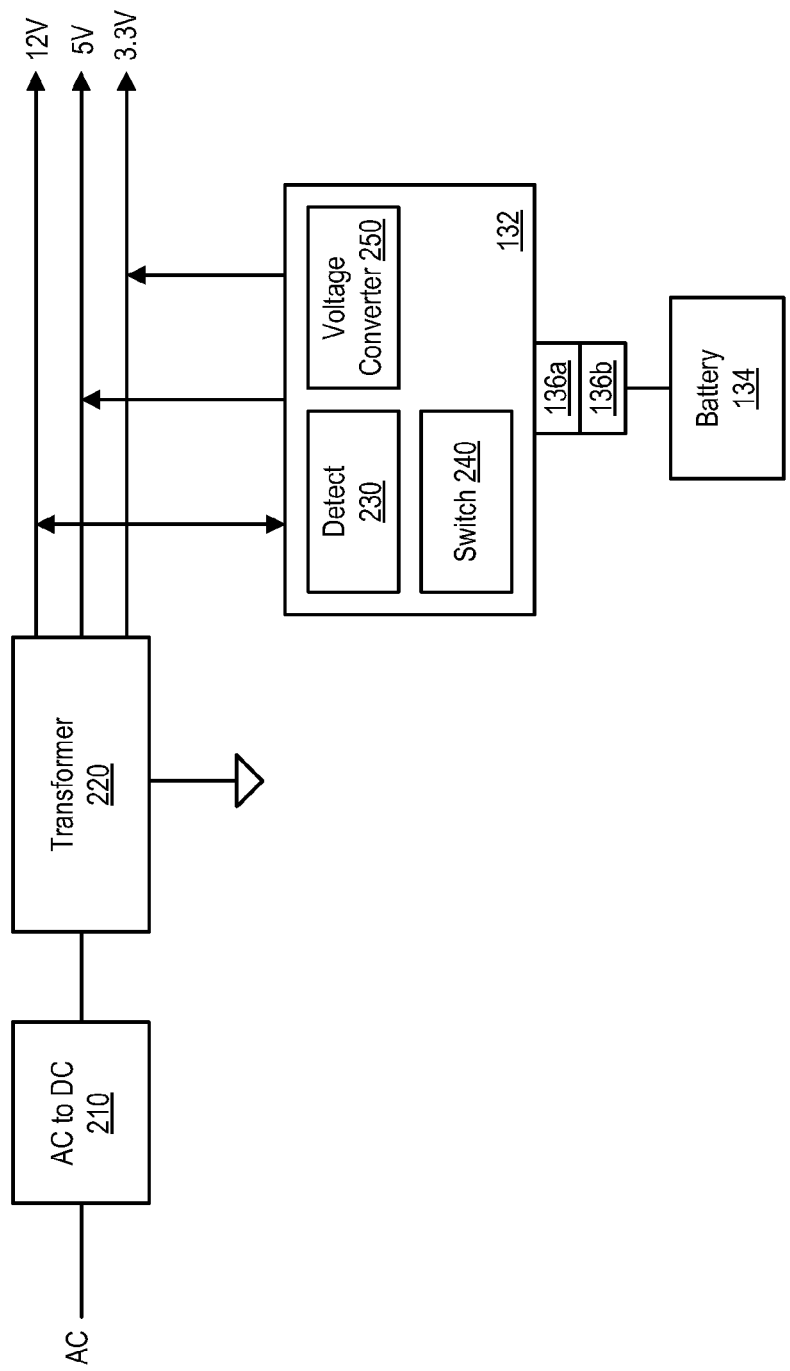
FIGS. 2 and 3 show block diagrams of a UPS system which includes an integrated UPS control system according to the invention.
Figure 3:
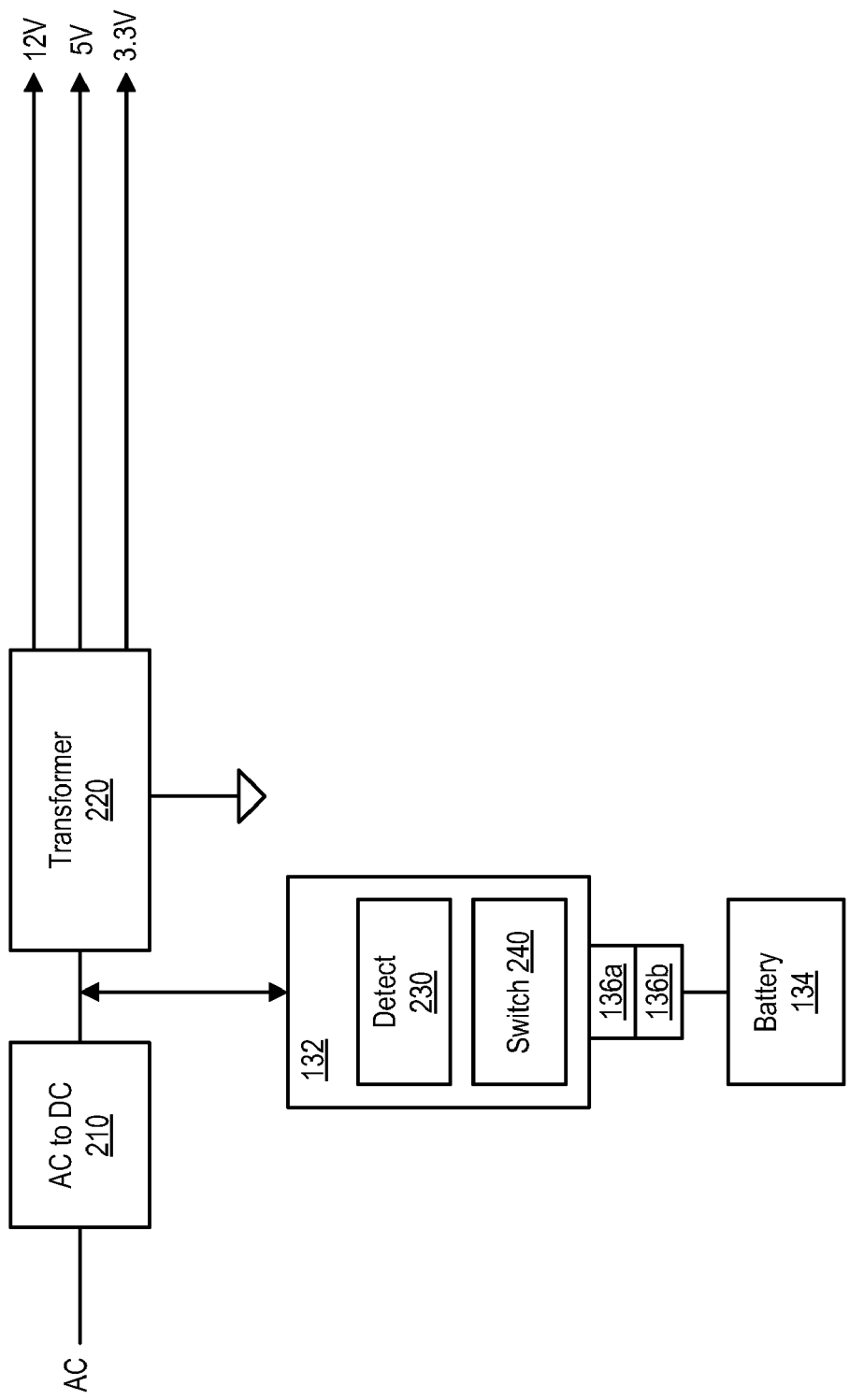

Referring to FIGS. 2 and 3, a block diagram of UPS system 140 which includes an integrated UPS control system 132 is shown. More specifically, in addition to the UPS control system 132, the power supply includes an AC to DC converter circuit 210 and a voltage transformer circuit 220. The UPS control system 132 includes a detector circuit 230, a switch circuit 240 and a voltage converter circuit 250.

The AC to DC converter circuit 210 converts the AC input signal to a DC signal, which is provided to the voltage transformer circuit 220. The transformer circuit 220 receives the DC signal from the AC to DC converter circuit 210 and converts the DC signal to the various DC voltage levels used by the computer system 100.

At least one of the DC output voltages is provided to the UPS control system 132. The detector circuit 230 of the UPS control system monitors this input (and possibly other signals) to determine whether an AC input signal is being provided to the power supply 130. When the AC input signal is being provided, the UPS control system uses this DC voltage (or possibly another DC voltage) to provide a trickle charge to the battery 134.

When the AC input signal is not present, the detector circuit 230 generates a control signal that is provided to enable the switch circuit 240. When the switch circuit 240 is enabled, the switch circuit 240 turns on to pass a DC signal from the battery 134 to the voltage converter circuit 250. The voltage converter circuit 250 receives the DC signal from the battery and converts the DC signal to the various DC voltage levels used by the computer system 100.

By providing the integrated UPS control system 132 with an external battery connection, it is possible to couple a generic battery to the computer system 100 and thus to have a computer system which includes uninterruptible power supply functionality without the need of purchasing a separate uninterruptible power supply. For example, the generic battery can include a traditional 6 or 12 volt vehicle battery. The voltage converter 250 of the UPS control circuit 132 includes circuitry to detect the voltage of the DC signal from the generic battery and to convert this DC signal to the appropriate voltages for powering the computer system.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, it will be appreciated that variations to the functionality and design of the power supply 130 and the integrated UPS control circuit 132 can be made while keeping with the spirit and scope of the invention. For example referring to FIG. 3, the UPS control circuit 132 could be configured to be coupled to the output of the AC to DC converter circuit 210. In this way, the UPS control circuit would provide a single DC output voltage that is then converted to the various voltages used by the computer system via the transformer circuit 220 (thus eliminating the need for the voltage converter circuit 250).

Also for example, it will be appreciated that the computer system 100 can include many additional or fewer components, such as I/O adapters, interconnect bridges, non-volatile storage, ports for connection to networks or attached devices, etc. Because such components are not necessary for an understanding of the present invention, they are not illustrated in FIG. 1 or discussed further herein.

Also for example, in certain embodiments, the UPS system 140 may include a cable that is designed to safely couple the generic battery to the external connector 136a. Thus, the cable would include a connector 136b at one end as well as connector or connectors for safely connecting to the generic battery at the other end.

It will be appreciated that the present invention enables the leveraging of components within a power supply to provide efficient integrated uninterruptible power functionality. Accordingly, in certain embodiments, the power supply 130 could be implemented external to the remainder of the computer system 100 (e.g., via a power supply brick). In such a system, the combination of the power supply 130 and the battery 134 still provide uninterruptible power functionality without the need for duplicating power supply circuitry with a separate UPS system.

Consequently, the invention is intended to be limited only by the spirit and scope of the appended claims, giving full cognizance to equivalents in all respects.

What is claimed is:

1. An apparatus for providing uninterruptible power to a device comprising:
    a power supply, the power supply receiving an alternating current signal and generating a direct current signal, the direct current signal having a voltage for powering the device, the power supply comprising:
        an integrated uninterruptible power supply control system, the integrated uninterruptible power supply control system being integrated within the power supply, the integrated uninterruptible power supply control system being connectable to a battery, the integrated uninterruptible power supply control system providing a direct current signal from the battery to the device when the alternating current signal is not present; and,
            an external battery connector, the external battery connector being configured to enable connection of a generic battery to the integrated uninterruptible power supply control system.

2. The apparatus of claim 1 wherein the integrated uninterruptible power supply control system comprises:
    a detector circuit, the detector circuit receiving an input signal, the detector circuit determining if the input signal is not present and generating a power indication when the input signal is not present.

3. The apparatus of claim 2 wherein the integrated uninterruptible power supply control system comprises:
    a switch circuit coupled to the detector circuit and to the battery, the switch circuit receiving the power indication and providing the direct current signal from the battery to the device under control of the power indication.

4. The apparatus of claim 1 wherein the power supply comprises:
    a voltage converter circuit, the voltage converter circuit receiving a direct current input signal and providing a direct current output signal, the direct current output signal having a voltage for powering the device.

5. The apparatus of claim 4 wherein:
    the voltage converter circuit provides a plurality of direct current output signals, the plurality of direct current output signals having voltages for powering respective portions of the device.

6. A power supply for providing uninterruptible power to a device comprising:
    an alternating current to direct current converter circuit, the alternating current to direct current converter circuit receiving an alternating current signal and generating a direct current signal, the direct current signal having a voltage for powering the device; and,
    an integrated uninterruptible power supply control system, the integrated uninterruptible power supply control system being integrated within the power supply, the integrated uninterruptible power supply control system being connectable to a battery, the integrated uninterruptible power supply control system providing a direct current signal from the battery to the device when the alternating current signal is not present; and,
        an external battery connector, the external battery connector being configured to enable connection of a generic battery to the integrated uninterruptible power supply control system.

7. The power supply of claim 6 wherein the integrated uninterruptible power supply control system comprises:
    a detector circuit, the detector circuit receiving an input signal, the detector circuit determining if the input signal is not present and generating a power indication when the input signal is not present.

8. The power supply of claim 7 wherein the integrated uninterruptible power supply control system comprises:
a switch circuit coupled to the detector circuit and to the battery, the switch circuit receiving the power indication and providing the direct current signal from the battery to the device under control of the power indication.

9. The power supply of claim 6 further comprising:
a voltage converter circuit, the voltage converter circuit receiving a direct current input signal and providing a direct current output signal, the direct current output signal having a voltage for powering the device.

10. The power supply of claim 9 wherein:
the voltage converter circuit provides a plurality of direct current output signals, the plurality of direct current output signals having voltages for powering respective portions of the device.

11. A computer system comprising:
a processor;
a memory coupled to the processor;
a power supply for providing uninterruptible power to the processor and the memory, the power supply comprising:
an alternating current to direct current converter circuit, the alternating current to direct current converter circuit receiving an alternating current signal and generating a direct current signal, the direct current signal having a voltage for powering the computer system; and,
an integrated uninterruptible power supply control system, the integrated uninterruptible power supply control system being integrated within the power supply, the integrated uninterruptible power supply control system being connectable to a battery, the integrated uninterruptible power supply control system providing a direct current signal from the battery to the computer system when the alternating current signal is not present; and,
an external battery connector, the external battery connector being configured to enable connection of a generic battery to the integrated uninterruptible power supply control system.

12. The computer system of claim 11 wherein the integrated uninterruptible power supply control system comprises:
a detector circuit, the detector circuit receiving an input signal, the detector circuit determining if the input signal is not present and generating a power indication when the input signal is not present.

13. The computer system of claim 12 wherein the integrated uninterruptible power supply control system comprises:
a switch circuit coupled to the detector circuit and to the battery, the switch circuit receiving the power indication and providing the direct current signal from the battery to the computer system under control of the power indication.

14. The computer system of claim 11 wherein the power supply further comprises:
a voltage converter circuit, the voltage converter circuit receiving a direct current input signal and providing a direct current output signal, the direct current output signal having a voltage for powering the computer system.

15. The computer system of claim 14 wherein:
the voltage converter circuit provides a plurality of direct current output signals, the plurality of direct current output signals having voltages for powering respective portions of the computer system.

* * * * *